United States Patent
Benson et al.

(10) Patent No.: US 12,044,488 B2
(45) Date of Patent: Jul. 23, 2024

(54) INTERLOCKING DOVETAIL GEOMETRY JOINT

(71) Applicant: Hamilton Sundstrand Corporation, Charlotte, NC (US)

(72) Inventors: Callie Benson, Brooklyn, CT (US); Daniel E. Muntges, West Hartford, CT (US); John Sypek, Chicopee, MA (US); Keith J. Brooky, Wallingford, CT (US); Paul M. Colson, Westfield, MA (US); Michael Doe, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 208 days.

(21) Appl. No.: 17/449,747

(22) Filed: Oct. 1, 2021

(65) Prior Publication Data
US 2023/0105126 A1  Apr. 6, 2023

(51) Int. Cl.
*F28F 9/26* (2006.01)
*F28F 7/02* (2006.01)

(52) U.S. Cl.
CPC ............... *F28F 9/26* (2013.01); *F28F 7/02* (2013.01); *F28F 2280/00* (2013.01)

(58) Field of Classification Search
CPC ............. F28F 9/26; F28F 7/02; F28F 2280/00
See application file for complete search history.

(56) References Cited

U.S. PATENT DOCUMENTS

| | | | | |
|---|---|---|---|---|
| 1,773,200 A | * | 8/1930 | Price | F28F 9/0239 165/75 |
| 4,044,825 A | | 8/1977 | Gugenberger et al. | |
| 4,150,719 A | * | 4/1979 | Thielen | F28F 7/02 165/146 |
| 4,153,501 A | * | 5/1979 | Fink | B01D 19/0021 159/13.1 |
| 4,265,302 A | * | 5/1981 | Forster | F28F 7/02 165/DIG. 395 |
| 4,401,155 A | * | 8/1983 | Royal | F28D 9/0081 165/DIG. 392 |
| 4,727,935 A | * | 3/1988 | Lapeyre | F28F 7/02 165/DIG. 395 |
| 4,746,479 A | * | 5/1988 | Hanaki | F28F 7/02 264/150 |

(Continued)

FOREIGN PATENT DOCUMENTS

CN  212634982 U  3/2021

OTHER PUBLICATIONS

Extended European Search Report for EP Application No. 22198198.8, dated Mar. 3, 2023, pp. 7.

*Primary Examiner* — Raheena R Malik
(74) *Attorney, Agent, or Firm* — Kinney & Lange, P. A.

(57) ABSTRACT

A method of manufacturing a heat exchanger. The method includes additively manufacturing a first body with a first plurality of passages extending through the first body. Additively manufacturing a second body with a second plurality of passages extending through the second body. The method also includes, interlocking the first body with the second body such that the first plurality of passages is aligned with the second plurality of passages and fluidically connected with the second plurality of passages.

19 Claims, 7 Drawing Sheets

(56) References Cited

U.S. PATENT DOCUMENTS

| | | | | |
|---|---|---|---|---|
| 4,807,342 | A * | 2/1989 | Lapeyre | F28F 7/02 |
| | | | | 228/183 |
| 9,074,362 | B1 * | 7/2015 | Munz | E04B 2/22 |
| 9,316,450 | B2 * | 4/2016 | Engelhardt | F28F 1/22 |
| 10,458,725 | B2 | 10/2019 | Vanderwees et al. | |
| 11,466,455 | B2 * | 10/2022 | Gajare | E04C 1/392 |
| 2010/0071873 | A1 * | 3/2010 | Campagna | F24D 3/127 |
| | | | | 165/56 |
| 2011/0104513 | A1 * | 5/2011 | Maggioli | F27D 9/00 |
| | | | | 428/600 |
| 2017/0251573 | A1 * | 8/2017 | Harvilchuck | H05K 7/20627 |
| 2019/0003786 | A1 * | 1/2019 | Birkett | F28F 3/12 |
| 2019/0143836 | A1 * | 5/2019 | Burrows | B60L 58/26 |
| | | | | 429/120 |
| 2021/0148638 | A1 | 5/2021 | Disori et al. | |
| 2021/0180884 | A1 | 6/2021 | Hong et al. | |

* cited by examiner

INTERLOCKING DOVETAIL GEOMETRY JOINT

BACKGROUND

The present disclosure relates to an assembly, particularly to an assembly of two additively manufactured parts.

Additive manufacturing processes have limited envelopes for the production of components. Larger components need to be joined following build with a method that provides a structural sound connection between the details. In the joining of additively produced heat exchangers or pressure vessels, neither braze nor weld alone provides the necessary structural connection.

SUMMARY

In one example, an assembly extends in a lengthwise direction, a widthwise direction, and a height-wise direction and includes a first body and a second body. The first body includes a height in the height-wise direction, a width in the widthwise direction extending between a first side and a second side, and a length in the lengthwise direction. A first surface extends the length of the first body in the lengthwise direction. The first surface faces the first side of the first body. A second surface is opposite the first surface and extends the length of the first body in the lengthwise direction. The second surface faces the second side of the first body. A mating surface between the first surface and the second surface. A groove extends the length of the first body in the lengthwise direction between the first surface of the first body and the second surface of the first body. A second body includes a height in the height-wise direction; a width in the widthwise direction extending between a first side and a second side, and a length in the lengthwise direction. A second groove includes a first side extending in the lengthwise direction and the height-wise direction. The first side of the second groove faces the first side of the second body. A second side extends in the lengthwise direction and the height-wise direction. The second side is opposite the first side. The second side of the second groove faces the second side of the second body. A rail in the second groove and extends the length of the second body in the lengthwise direction between the first side of the second groove and the second side of the second groove. The first surface of the first body faces the first side of the second groove. The second surface of the first body faces the second side of the second groove. The rail of the second body fits within the groove.

In another example, an assembly extends in a lengthwise direction, a widthwise direction, and a height-wise direction and includes a first body and a second body. The first body includes a height in the height-wise direction, a width in the widthwise direction, and a length in the lengthwise direction. A first tapered surface tapered at a first angle extends in the lengthwise direction and in the height-wise direction. A second tapered surface tapered at a second angle extends in the lengthwise direction and extends in the height-wise direction. The second tapered surface is opposite the first tapered surface. A mating surface between the first tapered surface and the second tapered surface. A groove extends on the mating surface and extends the length of the first body in the lengthwise direction between the first tapered surface and the second tapered surface. A second body includes a height in the height-wise direction, a width in the widthwise direction extending between a first side and a second side, and a length in the lengthwise direction. A second groove includes a first tapered surface tapered at the first angle and extending in the lengthwise direction and extending in the height-wise direction. A second tapered surface tapered at the second angle and extending in the lengthwise direction and extending in the height-wise direction. The second tapered surface of the second body is opposite the first tapered surface of the second body. A rail in the second groove and extending the length of the second body in the lengthwise direction between the first tapered surface of the second groove and the second tapered surface of the second groove. The first tapered surface of the first body faces the first tapered surface of the second groove. The second tapered surface of the first body faces the second tapered surface of the second groove. The rail of the second groove fits within the groove of the first body.

In another example, a method of manufacturing a heat exchanger. The method includes additively manufacturing a first body with a first plurality of passages extending through the first body. Additively manufacturing a second body with a second plurality of passages extending through the second body. The method also includes, interlocking the first body with the second body such that the first plurality of passages is aligned with the second plurality of passages and fluidically connected with the second plurality of passages.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a joint used to join multiple additively manufactured components. Additive manufacturing machines have a limited envelope for the production of components. Thus, if a larger component is required, an assembly can be additively manufactured in multiple steps then joined together to form the component. For example, a first body can be made in a first additive manufacturing process, and a second body can be made in a second additive manufacturing process. After the first and second bodies are additively manufactured, the first and second bodies can be interlocked and joined together by brazing, welding, soldering, or any other means of permanently joining the first and second bodies. Heat exchangers and pressure vessels frequently are installed in harsh environments. For example, a heat exchanger or a pressure vessel used on aircraft must be able to withstand high temperatures and high vibrations. Conventional joining methods, e.g., brazing, welding, soldering, etc., alone or in combination do not provide enough strength or rigidity to survive in these harsh conditions. Therefore, a better joint to combine two or more bodies into one larger component or assembly while maintaining the necessary strength and rigidity has been developed. The assembly will be described below with reference to FIGS. 1A-4B.

Figure 1A:
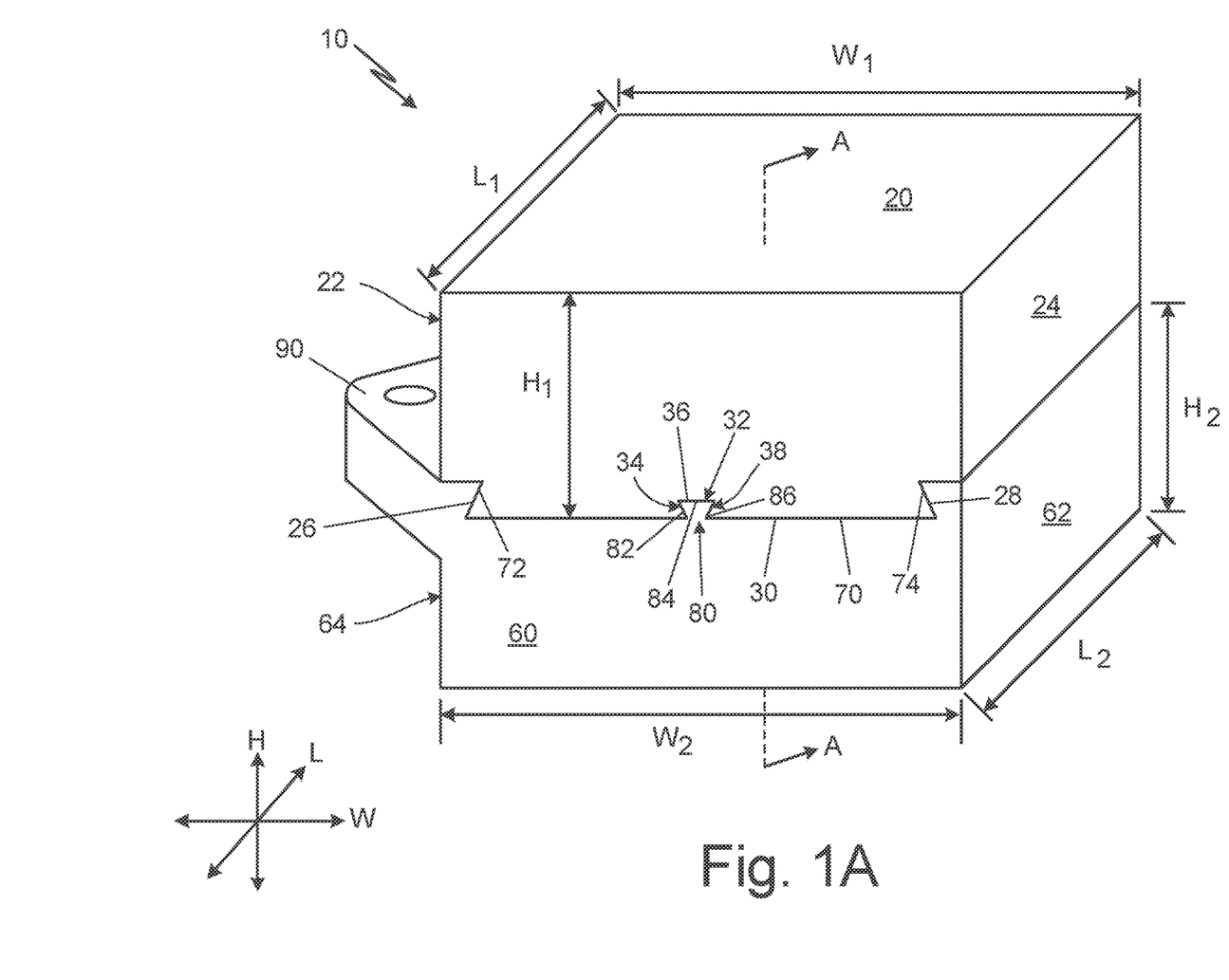
FIG. 1A is a perspective view of an assembly with a first body and a second body.
Figure 1B:
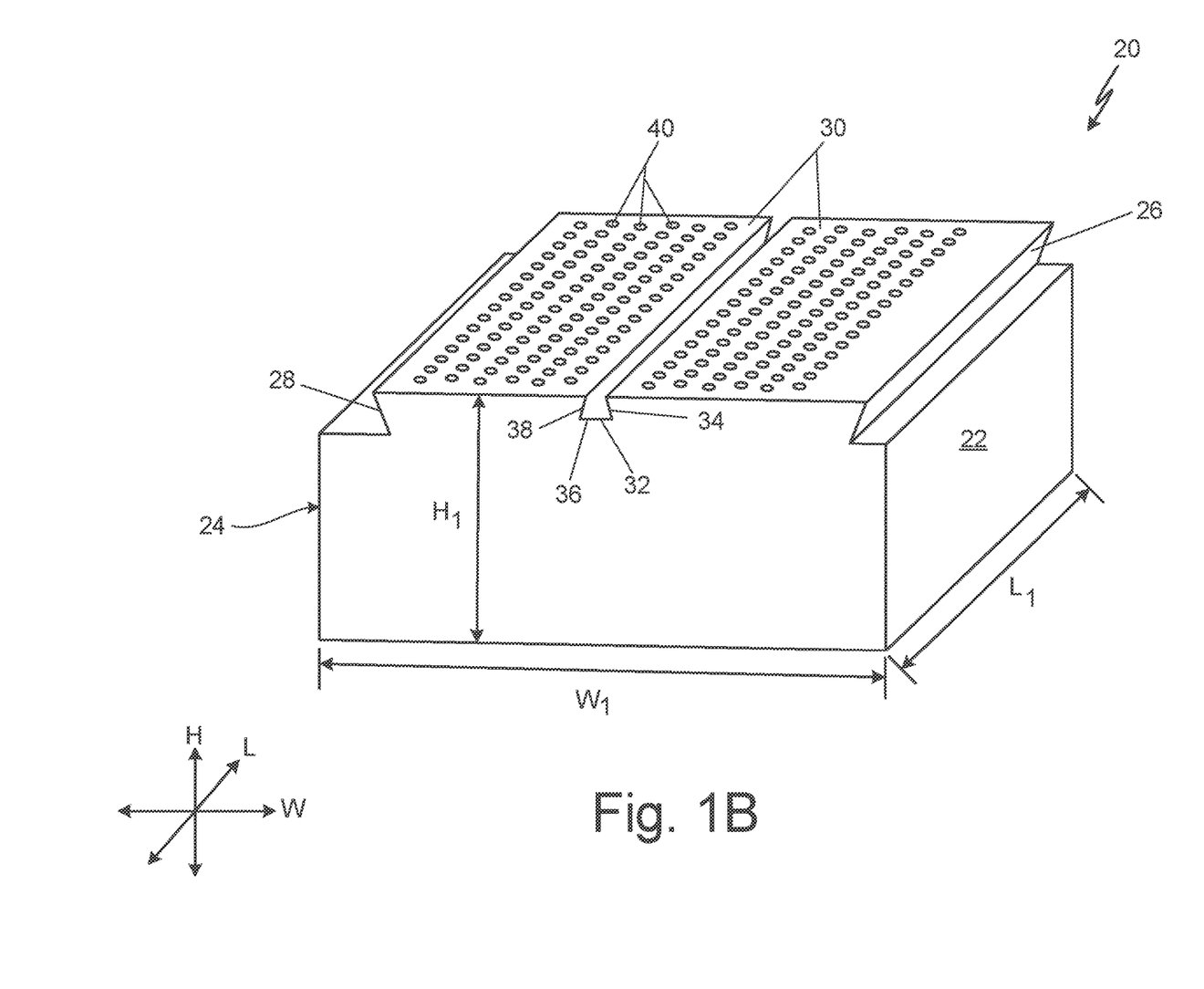
FIG. 1B is a perspective view of an example of the first body of the assembly of FIG. 1A.
Figure 1C:
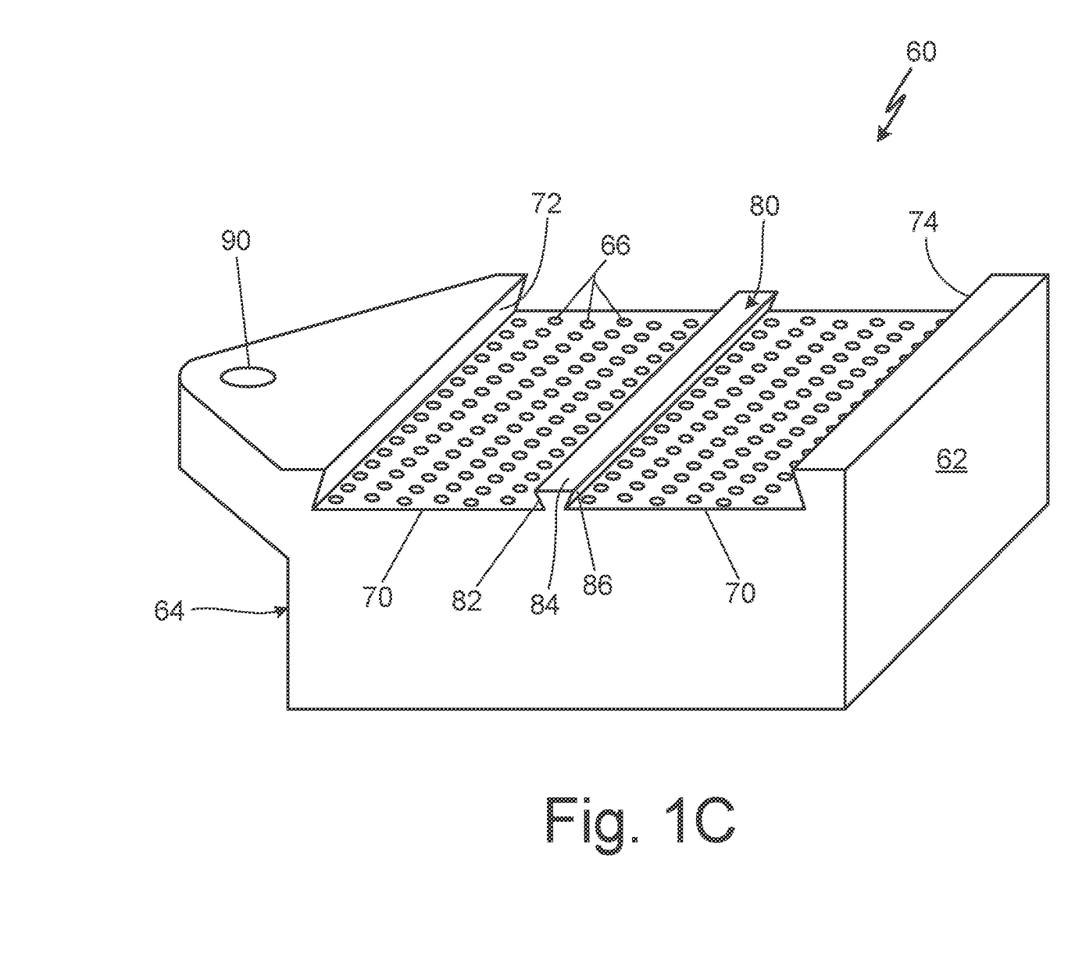
FIG. 1C is a perspective view of an example of a second body of the assembly of FIG. 1A.
Figure 2:
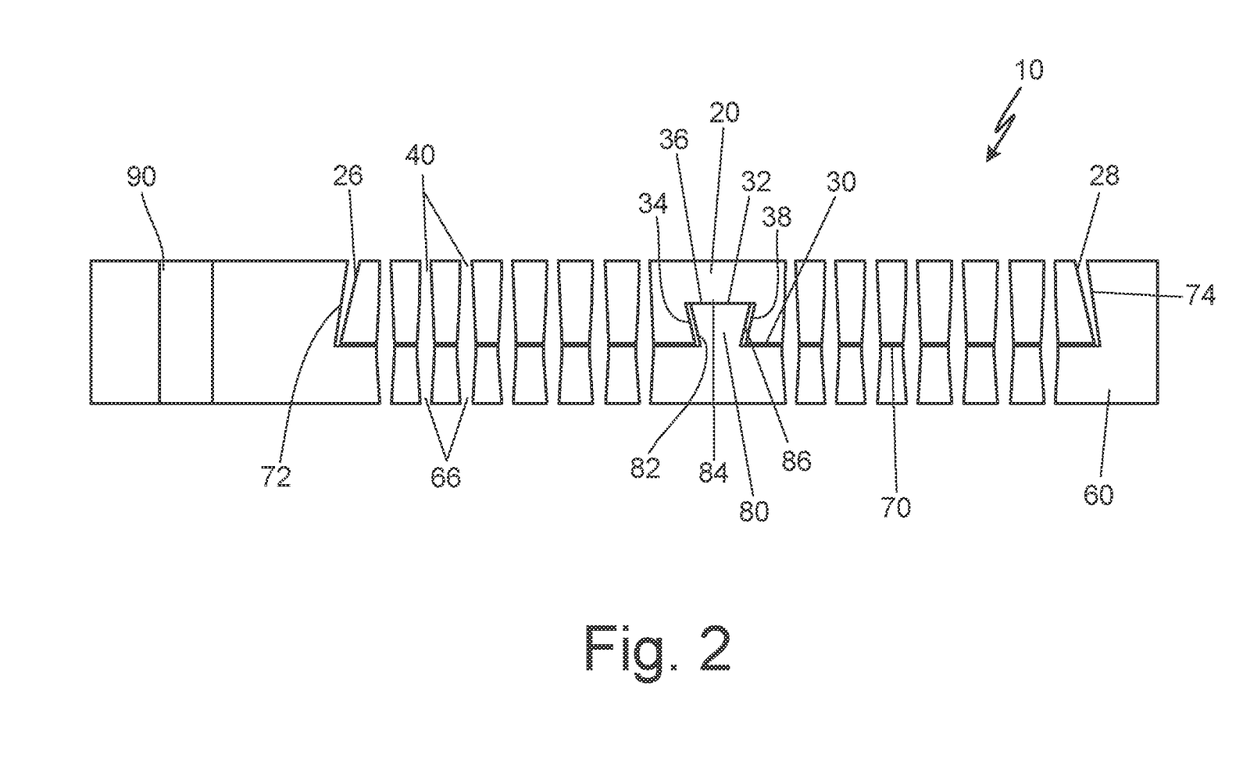
FIG. 2 is a cross-sectional view of an interlocking connection between the first body and the second body of the assembly of FIG. 1A taken along line A-A.

FIGS. 1A-1C and 2 will be discussed concurrently. FIG. 1A is a perspective view of assembly 10 with first body 20 and second body 60. FIG. 1B is a perspective view first body 20 of assembly 10. FIG. 1C is a perspective view of second body 60 of assembly 10. FIG. 2 is a cross-sectional view of an interlocking connection between first body 20 and second body 60 taken along lines A-A. Assembly 10 includes lengthwise direction L, widthwise direction W, height-wise direction H, first body 20, and second body 60. First body 20 includes height $H_1$, width $W_1$, length $L_1$, first side 22, second side 24, first surface 26 (also referred to as first tapered surface), second surface 28 (also referred to as second tapered surface), and mating surface 30. Mating surface 30 includes groove 32. Groove 32 includes first angled side 34, connecting side 36, and second angled side 38. Second body 60 includes height $H_2$, width $W_2$, length $L_2$, first side 62, second side 64, and second groove 70. Second groove 70 includes first side 72 (also referred to as first angled surface of second groove 70), second side 74 (also referred to as second angled surface of second groove 70), and rail 80. Rail 80 of second groove 70 includes first angled side 82, connecting side 84, and second angled side 86. Second body 60 can also include mounting bracket 90 extending from second side 64.

Heights ($H_1$ and $H_2$) extend in height-wise direction H. Widths ($W_1$ and $W_2$) extend in widthwise direction W. Lengths ($L_1$ and $L_2$) extend in lengthwise direction L. Width $W_1$ of first body 20 extends between first side 22 and second side 24. First surface 26 extends length $L_1$ of first body 20 in lengthwise direction L. First surface 26 faces first side 22 of first body 20 and angles toward first side 22 as first surface 26 extends toward mating surface 30. Second surface 28 is opposite of first surface 26 and extends length $L_1$ of first body 20 in lengthwise direction L. Second surface 28 faces second side 24 of first body 20 and angles toward second side 24 as second surface 28 extends toward mating surface 30. Groove 32 is formed on mating surface 30 between first surface 26 and second surface 28. Groove 32 extends length $L_1$ of first body 20 in lengthwise direction L between first surface 26 of first body 20 and second surface 28 of first body 20.

Width $W_2$ of second body 60 extends between first side 62 of second body 60 and second side 64 of second body 60. Second groove 70 is formed in second body 60 between first side 62 and second side 64. First side 72 of second groove 70 extends length $L_2$ of second body 60 in lengthwise direction L and height-wise direction H. First side 72 of second groove 70 faces first side 62 of second body 60. Second side 74 extends length $L_2$ of second body 60 in lengthwise direction L and in the height-wise direction H. Second side 74 of second groove 70 faces second side 64 of second body 60. First side 72 and second side 74 of second groove 70 are angled and converge toward each other as the first side 72 and the second side 74 extend in height-wise direction H toward first body 20. Rail 80 is in second groove 70 and extends length $L_2$ of second body 60 in lengthwise direction L. Rail 80 is between first side 72 of second groove 70 and second side 74 of second groove 70. First surface 26 of first body 20 faces first side 72 of second groove 70. First surface 26 of first body 20 faces second side 74 of second groove 70. Rail 80 fits within groove 32 of mating surface 30.

As shown in FIGS. 1B and 2, first body 20 can include first plurality of passages 40 ("passages 40"). Passages 40 extend through mating surface 30. Second angled side 38 of groove 32 is opposite of first angled side 34 of groove 32. Connecting side 36 of groove 32 extends in widthwise direction W from first angled side 34 of groove 32 to second angled side 38 of groove 32 to form dovetail groove profile.

As shown in FIGS. 1C and 2, second body 60 can include second plurality of passages 66 ("passages 66"). Passages 40 and passages 66 can be discussed in combination as passages (40 and 66). Passages 66 extend through second groove 70. In assembly 10, second angled side 86 of rail 80 is opposite of first angled side 82 of rail 80. Connecting side 84 of rail 80 extends in widthwise direction W from first angled side 82 of rail 80 to second angled side 86 of rail 80 to form a dovetail rail profile. In the example shown in FIGS. 1C and 2, second body 60 includes mounting bracket 90. Mounting bracket 90 can be a hole, slot, flange, and/or any other design that can mount second body 60 to a wall or surface. In another example, second body 60 does not require mounting bracket 90 because assembly 10 is supported by the system that assembly 10 is installed within.

As shown in FIGS. 1A and 2, first body 20 and second body 60 are assembled to make assembly 10. When first body 20 and second body 60 are combined to make assembly 10, first angled side 82 of rail 80 faces first angled side 34 of groove 32. Connecting side 84 of rail 80 faces connecting side 36 of groove 32. Second angled side 86 of rail 80 faces second angled side 38 of groove 32. Rail 80 of second groove 70 and groove 32 of mating surface 30 are sized so that rail 80 of second groove 70 fits within groove 32 of mating surface 30 with minimal clearance. The minimal clearance between rail 80 of second groove 70 and groove 32 of mating surface 30 improves the rigidity of assembly 10 because rail 80 of second groove 70 and groove 32 of mating surface 30 interact with one another to counteract stresses or torques applied to assembly 10. In the example of FIGS. 1A-1C and 2, there is one rail 80 of second groove 70 and one groove 32 of mating surface 30. In another example, second groove 70 can include a plurality of rails 80 and mating surface 30 can include a plurality of grooves 32. The increase in the number of rails 80 and grooves 32 increases the rigidity of assembly 10. Thus, if assembly 10 is going to be in a harsh environment, increasing the number of rails 80 and grooves 32 is one way to improve the rigidity of assembly 10. When first body 20 and second body 60 are assembled to make assembly 10, passages 40 are aligned with passages 66 so that fluid can pass through first body 20 and second body 60 via passages 40 and passages 66 in height-wise direction H.

As shown best in FIG. 2, first surface 26 of first body 20 can be tapered at first angle θ relative mating surface 30, and second surface 28 of first body 20 can be tapered at second angle ϕ relative mating surface 30. Both first angle θ and second angle ϕ are less than 90 degrees relative mating surface 30. First side 72 of second groove 70 can be tapered at first angle θ, and second side 74 of second groove 70 can be angled at second angle ϕ. Tapering first surface 26 of first body 20 and first side 72 of second groove 70 at first angle θ ensures that first body 20 interlocks with second body 60 with minimal clearance. Similarly, tapering second surface 28 of first body 20 and second side 74 of second groove 70 at second angle ϕ ensures that first body 20 interlocks with second body 60 with minimal clearance. The minimal clearance between first body 20 and second body 60 improves the rigidity and strength of assembly 10. When assembly 10 is exposed to torque or stress, first body 20 interacts with second body 60 to resist the torque or stress, decreasing the stress on assembly 10. Therefore, the combination of the tight tolerance between rail 80 of second groove 70 and groove 32 of mating surface 30 and the tight tolerances between first body 20 and second body 60 assist in making assembly 10 more rigid than traditional means of joining two pieces in a heat exchanger or a pressure vessel.

Figure 3:
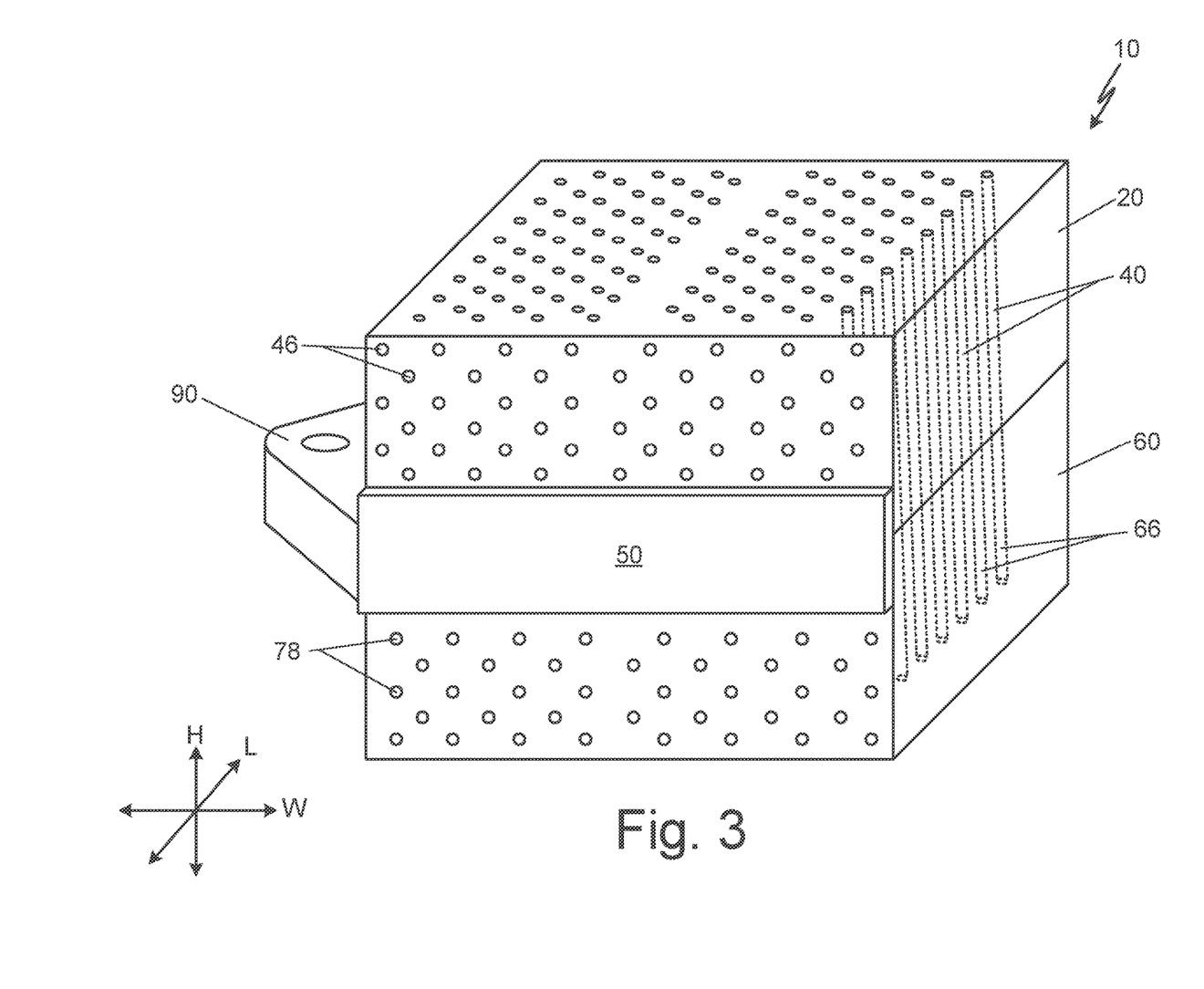
FIG. 3 is a perspective view of another example of an assembly.

FIG. 3 is a perspective view of another example of assembly 10. As shown in FIG. 3, assembly 10 can include locking member 50. First body 20 can include second plurality of passages 46 ("second passages 46"). Second body 60 can include second plurality of passages 78 ("second passages 78"). As also shown in FIG. 3, assembly 10 can be a heat exchanger assembly. First body 20 is a first heat exchanger core and second body 60 is a second heat exchanger core. Thus, assembly 10 is one large heat exchanger assembly that combines first body 20 and second body 60 in to a single heat exchanger core.

Mating surface 30 of first body 20 can be brazed to second groove 70 of second body 60 to remove slop between first body 20 and second body 60 and to improve the rigidity of assembly 10. Further, first body 20 can be spot welded to second body 60. Locking member 50 extends in widthwise direction W and can be attached to first body 20 and second body 60. More specifically, after assembly 10 is created by joining first body 20 and second body 60, locking member 50 can be welded and/or brazed to both first body 20 and second body 60. Locking member 50 keeps first body 20 and second body 60 together as assembly 10. More specifically, locking member 50 helps maintain rail 80 of second groove 70 within groove 32 of mating surface 30. Additionally, locking member 50 improves the rigidity and structural integrity of assembly 10. In the example of FIG. 3, there is one locking member 50. In another example, there can be two or more locking members 50 installed onto first body 20 and second body 60 to improve the rigidity of assembly 10.

As best shown in FIG. 3, passages 40 extend through the entire height $H_1$ of first body 20 in height-wise direction H. Passages 66 extend through the entire height $H_2$ of second body 60 in height-wise direction H. As also shown in FIGS. 2 and 3, passages 40 are aligned with passages 66. Because passages 40 of first body 20 and passages 66 of second body 60 are aligned and passages 40 of first body 20 extend through mating surface 30 and passages 66 of second body 60 extend through second groove 70, first body 20 and second body 60 are fluidically connected. With passages 40 and passages 66 fluidically connected, first body 20 and second body 60 can function together as a single heat exchanger core with a first fluid flow passing through first body 20 and second body 60 in height-wise direction H via first passages 40 and second passages 66. In another example, passages (40 and 66) can be fluidically isolated so that the first heat exchanger of first body 20 and the second heat exchanger of second body 60 still make up assembly 10 but function as separate heat exchangers.

Second passages 46 of first body 20 extend in lengthwise direction L through first body 20. Second passages 78 of second body 60 extend in lengthwise direction L through second body 60. In one example, passages (40 and 60) can be configured to direct a hot flow through assembly 10, while passages (46 and 78) can be configured to direct a cold flow through assembly 10. In another example, passages (40 and 60) can be configured to direct a cold flow through assembly 10, while passages (46 and 78) can be configured to direct a hot flow through assembly 10.

Figure 4A:
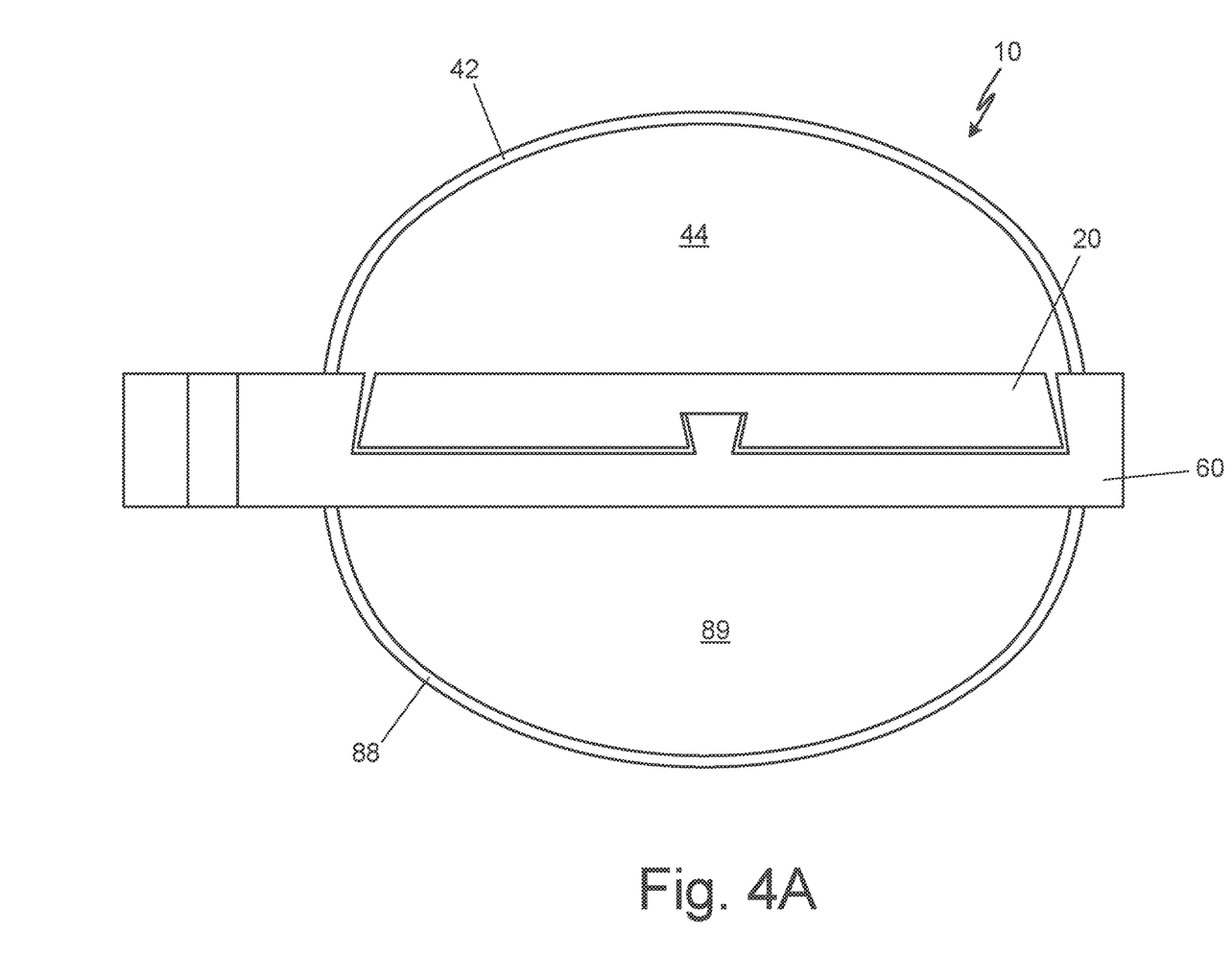
FIG. 4A is a cross-sectional view of another example of an assembly.
Figure 4B:
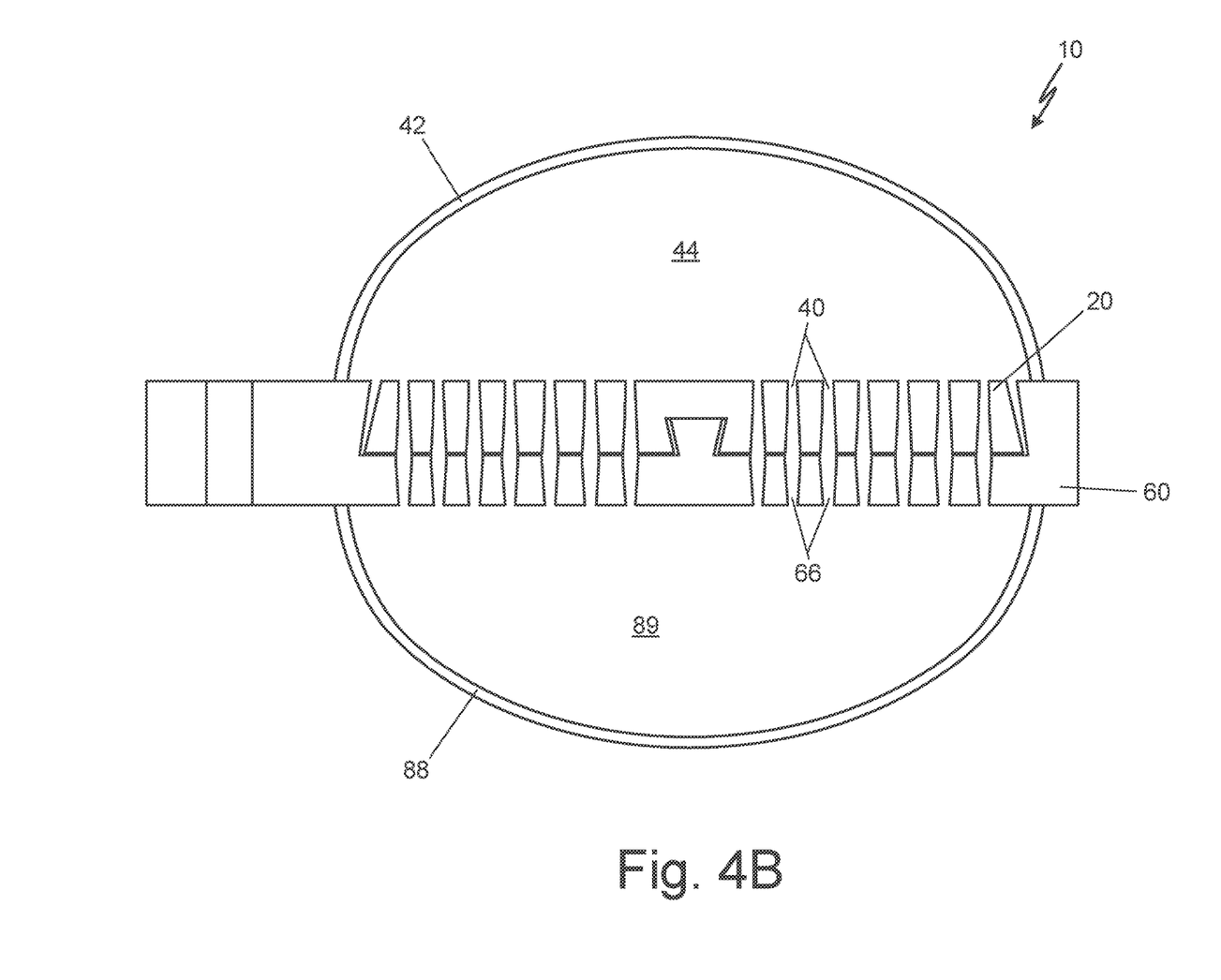
FIG. 4B is a cross-sectional view of another example of an assembly.

FIGS. 4A and 4B will be discussed concurrently. FIG. 4A is a cross-sectional view of another example of assembly 10. FIG. 4B is a partial cross-sectional view of another example of assembly 10. As shown in FIGS. 4A and 4B, first body 20 can be a first pressure vessel, and second body 60 can be a second pressure vessel. In the examples in FIGS. 4A and 4B, first body 20 includes wall 42 and chamber 44, and second body 60 includes wall 88 and chamber 89. Wall 42 of first body 20 and wall 88 of second body 60 can be discussed together as walls (42 and 48). Walls (42 and 88) protect assembly 10 from the outside environment and define chambers (44 and 89), respectively. In the example of FIG. 4A, chamber 44 of first body 20 is fluidically isolated from chamber 89 of second body 60. In the example shown in FIG. 4B, first body 20 can include passages 40, and second body 60 can include passages 66. Passages (40 and 66) are aligned such that chamber 44 of first body 20 is fluidically connected to chamber 89 of second body 60. First body 20 and second body 60 of the examples of FIGS. 4A and 4B interlock in the same manner as described above with regards to FIGS. 1A-3.

When forming the embodiments of FIGS. 1A-4B, first body 20 can be additively manufactured using powder bed fusion, fuse deposition modeling, binder jetting, material jetting, and/or any other additive manufacturing method. Second body 60 can be additively manufactured using powder bed fusion, fuse deposition modeling, binder jetting, material jetting, and/or any other additive manufacturing method. As discussed above, additive manufacturing processes are limited in the size of components they can make. Thus, to make larger components, the components must be joined after being additively manufactured. Therefore, after first body 20 and second body 60 are additively manufactured, first body 20 and second body 60 can be assembled and interlocked to make assembly 10. Sliding first body 20 into second body 60, and more specifically, rail 80 of second groove 70 into groove 32 of mating surface 30, creates larger assembly 10. After assembly 10 is created, first body 20 and second body 60 can be brazed, welded, and/or permanently attached by any other means of joining two objects. Additionally, locking member 50 can be welded, brazed, and/or permanently attached using any other method to first body 20 and second body 60 to increase the structural integrity and improve the rigidity of assembly 10.

Discussion of Possible Embodiments

The following are non-exclusive descriptions of possible embodiments of the present invention.

In one example, an assembly extends in a lengthwise direction, a widthwise direction, and a height-wise direction and includes a first body and a second body. The first body includes a height in the height-wise direction, a width in the widthwise direction extending between a first side and a second side, and a length in the lengthwise direction. A first surface extends the length of the first body in the lengthwise direction. The first surface faces the first side of the first body. A second surface is opposite the first surface and extends the length of the first body in the lengthwise direction. The second surface faces the second side of the first body. A mating surface between the first surface and the second surface. A groove extends the length of the first body in the lengthwise direction between the first surface of the first body and the second surface of the first body. A second body includes a height in the height-wise direction; a width in the widthwise direction extending between a first side and a second side, and a length in the lengthwise direction. A second groove includes a first side extending in the lengthwise direction and the height-wise direction. The first side of the second groove faces the first side of the second body. A second side extends in the lengthwise direction and the height-wise direction. The second side is opposite the first side. The second side of the second groove faces the second side of the second body. A rail in the second groove and extends the length of the second body in the lengthwise direction between the first side of the second groove and the second side of the second groove. The first surface of the first body faces the first side of the second groove. The second surface of the first body faces the second side of the second groove. The rail of the second body fits within the groove.

The assembly of the preceding paragraph can optionally include, additionally and/or alternatively, any one or more of the following features, configurations and/or additional components:

wherein the groove includes: a first angled side; a connecting side; and a second angled side, wherein the second angled side is opposite the first angled side, and wherein the connecting side extends in the widthwise direction between the first angled side and the second angled side to form a dovetail groove profile, and wherein the rail of the second groove includes: a first angled side; a connecting side; and a second angled side, wherein the second angled side of the rail is opposite the first angled side of the rail, and wherein the connecting side of the rail extends in the widthwise direction from the first angled side of the rail to the second angled side of the rail to form a dovetail rail profile;

wherein the first angled side of the rail faces the first angled side of the groove, wherein the connecting side of the rail faces the connecting side of the groove, and wherein the second angled side of the rail faces the second angled side of the groove;

further including: a locking member extending in the widthwise direction, wherein the locking member is configured to be attached to the first body and the second body, and wherein the locking member is configured to keep the rail of the second body within the groove of the first body;

wherein the first body is brazed to the second body, and wherein the locking member is welded to the first body and the second body;

wherein the first body is a first heat exchanger, and wherein the second body is a second heat exchanger;

wherein the first heat exchanger includes: a first plurality of passages extending through the first heat exchanger in the height-wise direction;

wherein the second heat exchanger includes: a second plurality of passages extending through the second heat exchanger in the height-wise direction;

wherein the first plurality of passages of the first heat exchanger is aligned with and fluidically connected to the second plurality of passages of the second heat exchanger;

wherein the first body is a first pressure vessel, and wherein the second body is a second pressure vessel;

wherein the first pressure vessel includes: a first plurality of passages extending within the first pressure vessel in the height-wise direction;

wherein the second pressure vessel includes: a second plurality of passages extending within the second pressure vessel in the height-wise direction, wherein the first plurality of passages of the first pressure vessel extends through the mating surface of the first body, and wherein the second plurality of passages of the second pressure vessel extends in the height-wise direction through the second groove of the second body; and/or wherein the first plurality of passages of the first pressure vessel is aligned with and fluidically connected to the second plurality of passages of the second pressure vessel.

In another example, an assembly extends in a lengthwise direction, a widthwise direction, and a height-wise direction and includes a first body and a second body. The first body includes a height in the height-wise direction, a width in the widthwise direction, and a length in the lengthwise direction. A first tapered surface tapered at a first angle extends in the lengthwise direction and in the height-wise direction. A second tapered surface tapered at a second angle extends in the lengthwise direction and extends in the height-wise direction. The second tapered surface is opposite the first tapered surface. A mating surface between the first tapered surface and the second tapered surface. A groove extends on the mating surface and extends the length of the first body in the lengthwise direction between the first tapered surface and the second tapered surface. A second body includes a height in the height-wise direction, a width in the widthwise direction extending between a first side and a second side, and a length in the lengthwise direction. A second groove includes a first tapered surface tapered at the first angle and extending in the lengthwise direction and extending in the height-wise direction. A second tapered surface tapered at the second angle and extending in the lengthwise direction and extending in the height-wise direction. The second tapered surface of the second body is opposite the first tapered surface of the second body. A rail in the second groove and extending the length of the second body in the lengthwise direction between the first tapered surface of the second groove and the second tapered surface of the second groove. The first tapered surface of the first body faces the first tapered surface of the second groove. The second tapered surface of the first body faces the second tapered surface of the second groove. The rail of the second groove fits within the groove of the first body.

The assembly of the preceding paragraph can optionally include, additionally and/or alternatively, any one or more of the following features, configurations and/or additional components:

wherein the groove of the mating surface includes: a first angled side; a connecting side; and a second angled side, wherein the second angled side is opposite the first angled side, and wherein the connecting side extends in the widthwise direction between the first angled side and the second angled side, and wherein the rail of the second body includes: a first angled side; a connecting side; and a second angled side, wherein the second angled side of the rail is opposite the first angled side of the rail, and wherein the connecting side of the rail extends in the widthwise direction from the first angled side of the rail to the second angled side of the rail;

wherein the rail fits within the groove such that the first angled side of the rail faces the first angled side of the groove, the connecting side of the rail faces the connecting side of the groove, and the second angled side of the rail faces the second angled side of the groove;

further including: a locking member extending in the widthwise direction, wherein the locking member is attached to the first body and the second body, wherein the locking member is configured to keep the rail of the second body within the groove of the mating surface, wherein the mating surface of the first body is brazed to the second body, and wherein the locking member is welded to the first body and the second body;

wherein the first body is a first heat exchanger including: a first plurality of passages extending through the mating surface of the first heat exchanger in the height-wise direction, wherein the second body is a second heat exchanger including: a second plurality of passages extending through the groove of the second heat exchanger in the height-wise direction, and wherein the first plurality of passages of the first heat exchanger is fluidically connected to the second plurality of passages of the second heat exchanger; and/or wherein the first body is a first pressure vessel including: a first plurality of passages extending through the mating surface of the first pressure vessel in the height-wise direction, wherein the second body is a second pressure vessel including: a second plurality of passages extending through the second groove of the second pressure vessel in the height-wise direction, wherein the first plurality of passages of the first pressure vessel is aligned with and fluidically connected to the second plurality of passages of the second pressure vessel.

In another example, a method of manufacturing a heat exchanger. The method includes additively manufacturing a first body with a first plurality of passages extending through the first body. Additively manufacturing a second body with a second plurality of passages extending through the second body. The method also includes, interlocking the first body with the second body such that the first plurality of passages is aligned with the second plurality of passages and fluidically connected with the second plurality of passages.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, as discussed above groove 32 of mating surface 30 has dovetail groove profile, and rail 80 of second groove 70 has dovetail rail profile. In another example, groove 32 of mating surface 30 can have a square, rounded, and/or any other shape groove profile, and rail 80 of second groove 70 can have a square, rounded, and/or any other shape rail profile corresponding to the grove profile of groove 32 of mating surface 30. Therefore, it is intended that the invention not be limited to the particular embodiment(s) disclosed, but that the invention will include all embodiments falling within the scope of the appended claims.

The invention claimed is:

1. An assembly extending in a lengthwise direction, a widthwise direction, and a height-wise direction comprising:
   a first body, wherein the first body comprises:
      a height in the height-wise direction;
      a width in the widthwise direction extended between a first side and a second side;
      a length in the lengthwise direction;
      a first surface extending the length of the first body in the lengthwise direction, wherein the first surface faces the first side of the first body;
      a second surface opposite the first surface and extending the length of the first body in the lengthwise direction, wherein the second surface faces the second side of the first body;
      a mating surface between the first surface and the second surface, wherein the mating surface includes a first plurality of passages extending through the mating surface in a height-wise direction; and
      a groove extending the length of the first body in the lengthwise direction between the first surface of the first body and the second surface of the first body and
   a second body comprising:
      a height in the height-wise direction;
      a width in the widthwise direction extending between a first side and a second side;
      a length in the lengthwise direction;
      a second groove, wherein the second groove comprises:
         a first side extending in the lengthwise direction and the height-wise direction, wherein the first side of the second groove faces the first side of the second body;
         a second side extending in the lengthwise direction and the height-wise direction, wherein the second side is opposite the first side, and wherein the second side of the second groove faces the second side of the second body;
         a second plurality of passages extending through the second groove in a height-wise direction; and
         a rail in the second groove and extending the length of the second body in the lengthwise direction between the first side of the second groove and the second side of the second groove,
   wherein the first surface of the first body faces the first side of the second groove, and wherein the second surface of the first body faces the second side of the second groove, and wherein the rail of the second body fits within the groove;
   wherein when the first body and the second body are assembled to make an assembly, the first plurality of passages are aligned with the second plurality of passages so that a fluid can pass through the first body and the second body in a height-wise direction through the first plurality of passages and the second plurality of passages.

2. The assembly of claim 1, wherein the groove comprises:
   a first angled side;
   a connecting side; and
   a second angled side, wherein the second angled side is opposite the first angled side, and
   wherein the connecting side extends in the widthwise direction between the first angled side and the second angled side to form a dovetail groove profile, and wherein the rail of the second groove comprises:
a first angled side;
a connecting side; and
a second angled side, wherein the second angled side of the rail is opposite the first angled side of the rail, and wherein the connecting side of the rail extends in the widthwise direction from the first angled side of the rail to the second angled side of the rail to form a dovetail rail profile.

3. The assembly of claim 2, wherein the first angled side of the rail faces the first angled side of the groove, wherein the connecting side of the rail faces the connecting side of the groove, and wherein the second angled side of the rail faces the second angled side of the groove.

4. The assembly of claim 3, further comprising:
a locking member extending in the widthwise direction, wherein the locking member is configured to be attached to the first body and the second body, and wherein the locking member is configured to keep the rail of the second body within the groove of the first body.

5. The assembly of claim 4, wherein the first body is brazed to the second body, and wherein the locking member is welded to the first body and the second body.

6. The assembly of claim 5, wherein the first body is a first heat exchanger, and wherein the second body is a second heat exchanger.

7. The assembly of claim 6, wherein the first heat exchanger comprises:
a first plurality of passages extending through the first heat exchanger in the height-wise direction.

8. The assembly of claim 7, wherein the second heat exchanger comprises:
a second plurality of passages extending through the second heat exchanger in the height-wise direction.

9. The assembly of claim 8, wherein the first plurality of passages of the first heat exchanger is aligned with and fluidically connected to the second plurality of passages of the second heat exchanger.

10. The assembly of claim 5, wherein the first body is a first pressure vessel, and wherein the second body is a second pressure vessel.

11. The assembly of claim 10, wherein the first pressure vessel comprises:
a first plurality of passages extending within the first pressure vessel in the height-wise direction.

12. The assembly of claim 11, wherein the second pressure vessel comprises:
a second plurality of passages extending within the second pressure vessel in the height-wise direction, wherein the first plurality of passages of the first pressure vessel extends through the mating surface of the first body, and wherein the second plurality of passages of the second pressure vessel extends in the height-wise direction through the second groove of the second body.

13. The assembly of claim 12, wherein the first plurality of passages of the first pressure vessel is aligned with and fluidically connected to the second plurality of passages of the second pressure vessel.

14. An assembly extending in a lengthwise direction, a widthwise direction, and a height-wise direction comprising:
a first body comprising:
a height in the height-wise direction;
a width in the widthwise direction;
a length in the lengthwise direction;
a first tapered surface tapered at a first angle extending in the lengthwise direction and in the height-wise direction;
a second tapered surface tapered at a second angle extending in the lengthwise direction and extending in the height-wise direction, wherein the second tapered surface is opposite the first tapered surface; and
a mating surface between the first tapered surface and the second tapered surface; and
a groove extending on the mating surface and the length of the first body in the lengthwise direction between the first tapered surface and the second tapered surface, wherein the groove of the mating surface comprises:
a first angled side;
a connecting side; and
a second angled side, wherein the second angled side is opposite the first angled side, and wherein the connecting side extends in the widthwise direction between the first angled side and the second angled side; and
a second body comprising:
a height in the height-wise direction;
a width in the widthwise direction extending between a first side and a second side;
a length in the lengthwise direction;
a second groove comprising:
a first tapered surface tapered at the first angle and extending in the lengthwise direction and extending in the height-wise direction;
a second tapered surface tapered at the second angle and extending in the lengthwise direction and extending in the height-wise direction, wherein the second tapered surface of the second body is opposite the first tapered surface of the second body; and
a rail in the second groove and extending the length of the second body in the lengthwise direction between the first tapered surface of the second groove and the second tapered surface of the second groove, wherein the rail comprises:
a first angled side;
a connecting side; and
a second angled side, wherein the second angled side of the rail is opposite the first angled side of the rail, and wherein the connecting side of the rail extends in the widthwise direction from the first angled side of the rail to the second angled side of the rail,
wherein the first tapered surface of the first body faces the first tapered surface of the second groove, wherein the second tapered surface of the first body faces the second tapered surface of the second groove, and wherein the rail of the second groove fits within the groove of the first body.

15. The assembly of claim 14, wherein the rail fits within the groove such that the first angled side of the rail faces the first angled side of the groove, the connecting side of the rail faces the connecting side of the groove, and the second angled side of the rail faces the second angled side of the groove.

16. The assembly of claim 15, further comprising:
a locking member extending in the widthwise direction, wherein the locking member is attached to the first body and the second body, wherein the locking member is configured to keep the rail of the second body within the groove of the mating surface, wherein the mating surface of the first body is brazed to the second body, and wherein the locking member is welded to the first body and the second body.

17. The assembly of claim 16, wherein the first body is a first heat exchanger comprising:
a first plurality of passages extending through the mating surface of the first heat exchanger in the height-wise direction,
wherein the second body is a second heat exchanger comprising:
a second plurality of passages extending through the groove of the second heat exchanger in the height-wise direction, and
wherein the first plurality of passages of the first heat exchanger is fluidically connected to the second plurality of passages of the second heat exchanger.

18. The assembly of claim 16, wherein the first body is a first pressure vessel comprising:
a first plurality of passages extending through the mating surface of the first pressure vessel in the height-wise direction,
wherein the second body is a second pressure vessel comprising:
a second plurality of passages extending through the second groove of the second pressure vessel in the height-wise direction,
wherein the first plurality of passages of the first pressure vessel is aligned with and fluidically connected to the second plurality of passages of the second pressure vessel.

19. A method of manufacturing a heat exchanger, the method comprising:
additively manufacturing a first body with a first plurality of passages extending through the first body;
additively manufacturing a second body with a second plurality of passages extending through the second body; and
interlocking the first body with the second body such that the first plurality of passages is aligned with the second plurality of passages and fluidically connected with the second plurality of passages;

wherein first body comprises:
a height in the height-wise direction;
a width in the widthwise direction extended between a first side and a second side;
a length in the lengthwise direction;
a first surface extending the length of the first body in the lengthwise direction, wherein the first surface faces the first side of the first body;
a second surface opposite the first surface and extending the length of the first body in the lengthwise direction, wherein the second surface faces the second side of the first body;
a mating surface between the first surface and the second surface, wherein the mating surface includes a first plurality of passages extending through the mating surface in a height-wise direction; and
a groove extending the length of the first body in the lengthwise direction between the first surface of the first body and the second surface of the first body;
wherein the second body comprises:
a height in the height-wise direction;
a width in the widthwise direction extending between a first side and a second side;
a length in the lengthwise direction;
a second groove, wherein the second groove comprises:
a first side extending in the lengthwise direction and the height-wise direction, wherein the first side of the second groove faces the first side of the second body;
a second side extending in the lengthwise direction and the height-wise direction, wherein the second side is opposite the first side, and wherein the second side of the second groove faces the second side of the second body;
a second plurality of passages extending through the second groove in a height-wise direction; and
a rail in the second groove and extending the length of the second body in the lengthwise direction between the first side of the second groove and the second side of the second groove.

\* \* \* \* \*